United States Patent [19]

Kikuchi

[11] Patent Number: 4,854,680
[45] Date of Patent: Aug. 8, 1989

[54] ZOOM VIEW FINDER

[75] Inventor: Juro Kikuchi, Tokyo, Japan

[73] Assignee: Olympus Optical Co., Ltd., Tokyo, Japan

[21] Appl. No.: 166,552

[22] Filed: Mar. 10, 1988

[30] Foreign Application Priority Data

Mar. 11, 1987 [JP] Japan ................. 62-053993

[51] Int. Cl.$^4$ ............... G02B 15/14; G03B 13/02; G03B 13/10
[52] U.S. Cl. ................. 350/423; 354/219; 354/222
[58] Field of Search ............ 350/423, 426, 427, 428; 354/219, 222

[56] References Cited

U.S. PATENT DOCUMENTS

| | | | |
|---|---|---|---|
| 3,051,052 | 8/1962 | Bergstein | 350/423 |
| 3,454,321 | 7/1969 | Klein | 350/423 X |
| 3,788,731 | 1/1974 | Sugiura et al. | 350/423 |
| 4,018,510 | 4/1977 | Bertele | 350/423 |
| 4,094,587 | 6/1978 | Basanmatter et al. | 350/423 |
| 4,725,130 | 2/1988 | Ozawa | 350/427 |

FOREIGN PATENT DOCUMENTS 33-9389 10/1958 Japan .
61-167919 7/1986 Japan .
61-213817 9/1986 Japan .

Primary Examiner—Bruce Y. Arnold
Assistant Examiner—Scott J. Sugarman
Attorney, Agent, or Firm—Cusham, Darby & Cushman

[57] ABSTRACT

A zoom view finder comprising a plural number of lens units and so adapted as to perform zooming by displacing some of said lens units, said zoom view finder satisfying the following conditions:

$$1000 > \frac{(v_{max} - v_{min}) \cdot v_{min}}{\sqrt{z}} > 500 \quad (1)$$

$$P(\Delta\gamma)_{min} < 0 < P(\Delta\gamma)_{max} \quad (2)$$

wherein the reference symbol z represents zoom ratio of the lens system, the reference symbols $v_{max}$ and $v_{min}$ designate the maximum Abbe's number and the minimum Abbe's number respectively out of Abbe's numbers of said lens units, and the reference symbols $P(\Delta\gamma)_{max}$ and $P(\Delta\gamma)_{min}$ denotes the maximum and minimum values out of percentages of the chromatic aberrations of angular magnification relative to magnification levels.

7 Claims, 10 Drawing Sheets

FIG. 1
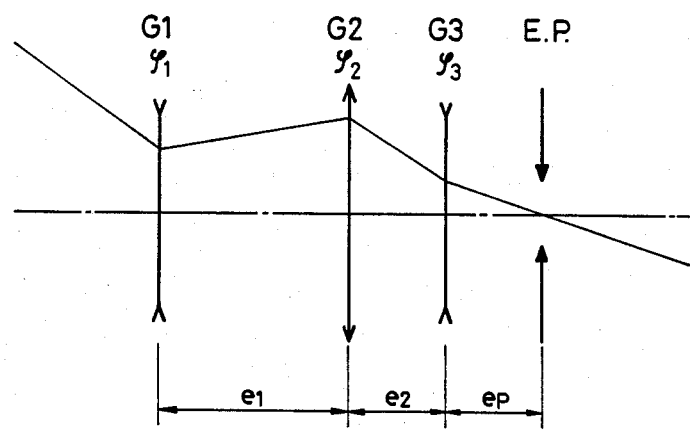
FIG. 2
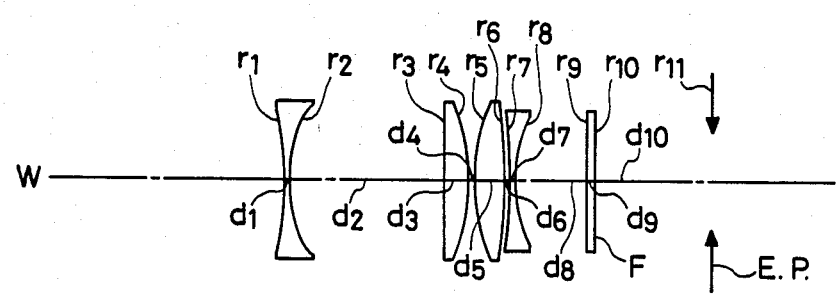
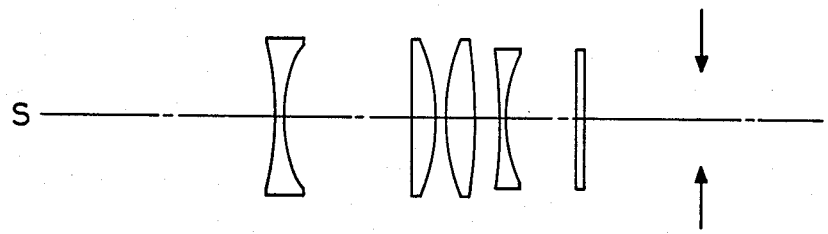
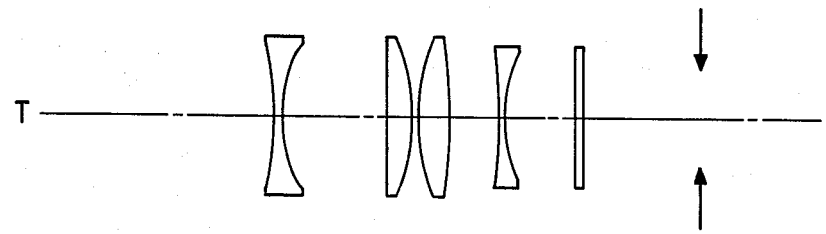

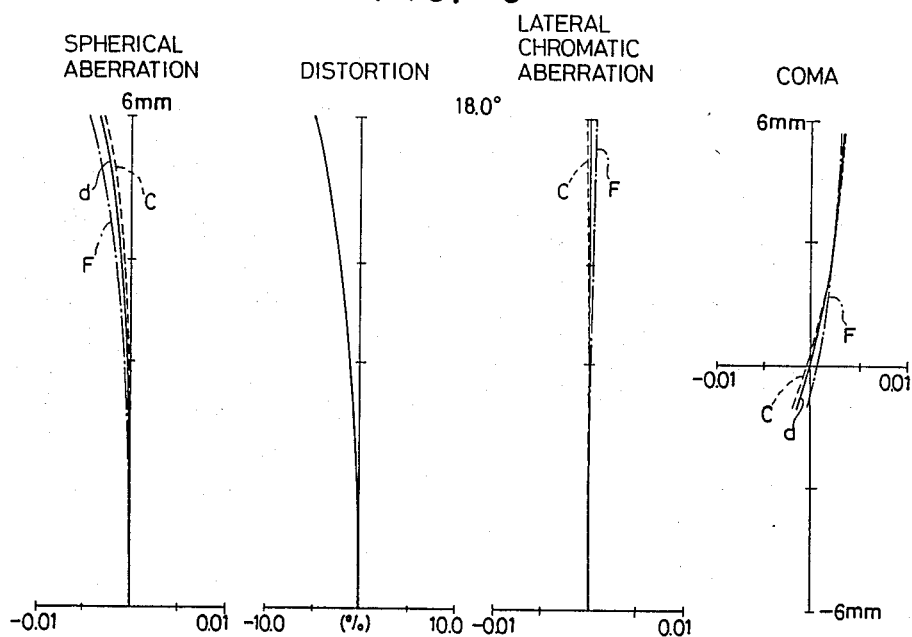
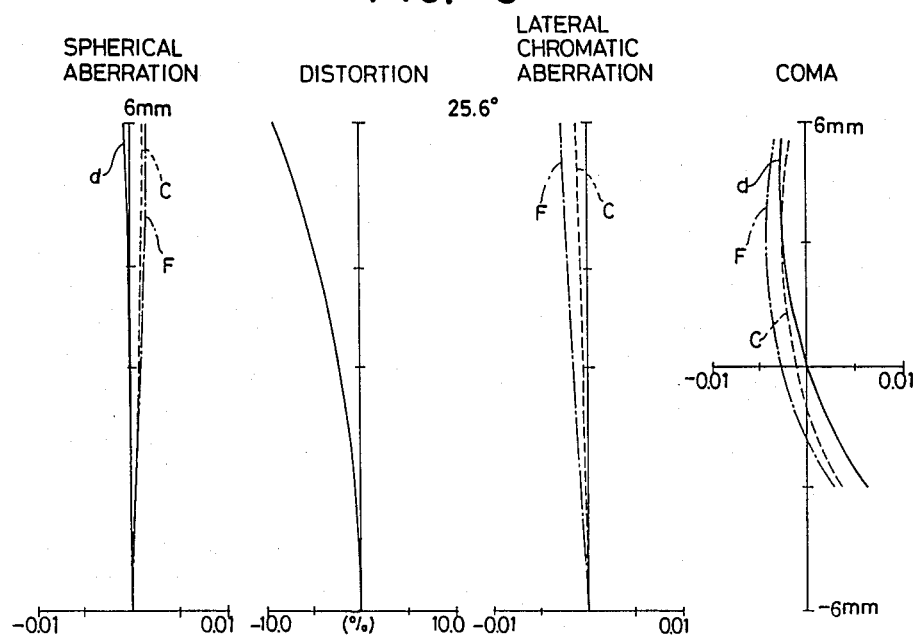

ZOOM VIEW FINDER

BACKGROUND OF THE INVENTION (a) Field of the Invention

The present invention relates to a zoom view finder and more specifically to a zoom view finder suited for use with photographic cameras and video cameras, and capable of varying magnification in the visual field of the view finder while keeping constant a diopter of the view finder.

(b) Description of the Prior Art

In the conventional camera consisting of a photographing system and a view finder system which are designed as separate units, it is preferable, in a case where the photographing system is designed as a varifocal system, to use a view finder so adapted as to vary magnification in the visual field of the view finder as magnification of the photographing system changes. Since the view finder system is to be assembled with a camera, it should desirably be compact and so composed as to provide a predetermined zoom ratio. Out of the conventionally known zoom view finders, the one disclosed by Japanese Examined Patent Publication No. 9389/33 is a Galilean telescope comprising a first negative lens, a second positive lens and a third negative lens arranged consecutively from the object side, and so adapted as to perform zooming by displacing the second lens and correction of diopter by displacing the third lens. This patent specification makes no reference to correction of aberrations in the view finder.

Further, the view finder disclosed by Japanese Unexamined Patent Publication No. 167919/61 is a Galilean telescope comprising a first negative lens unit, a second positive lens unit and a third negative lens unit, and so adapted as to perform zooming by displacing the second lens unit and correction of diopter by displacing the first or third lens unit. This view finder is very large since it is designed for a low zoom ratio of about 1.5 and a high maximum magnification range of 0.95 to 1.06. Further, since the view finder selects the above-mentioned magnification range, it does not correct chromatic aberration at the imaging position (longitudinal chromatic aberration) and allows images to be affected by flare though it favorably corrects lateral chromatic aberration.

The view finder disclosed by Japanese Unexamined Patent Publication No. 213817/61 is Galilean telescope comprising a first negative lens unit, a second positive lens unit and a third negative lens unit, and so adapted as to perform zooming and correction of diopter by relatively varying the airspaces between the lens units. This patent specification makes no reference to Abbe's number in the descriptions of the embodiment and does not take the chromatic aberrations into consideration accordingly. On assumptions that the lens units having the same refractive index in the embodiment have the same Abbe's number (the same glass material) and that the Abbe's numbers of the lens units are within a range of 25 to 80, chromatic aberration at the imaging position and lateral chromatic aberration should be remarkably produced at the same time regardless of glass materials (Abbe's numbers).

As a method to correct the chromatic aberrations in zoom lens systems, it is general to correct the aberrations in each lens group (lens unit). This method is effective to correct the chromatic aberrations favorably, but will require a large number of lens units and unavoidably prolong total lengths of the zoom lens systems, thereby increasing manufacturing cost accordingly.

SUMMARY OF THE INVENTION

A primary object of the present invention is to provide a compact zoom view finder comprising a plural number of lens units, having lateral chromatic aberration and longitudinal chromatic aberration (aberration at the imaging position) favorably corrected in the whole lens system, and manufacturable at a low cost.

The zoom view finder according to the present invention is so designed as to satisfy the following conditions for the purpose of correcting the chromatic aberrations not in each of the lens units but in the view finder as a whole:

$$1000 > \frac{(\nu_{max} - \nu_{min}) \cdot \nu_{min}}{\sqrt{z}} > 500 \quad (1)$$

$$P(\Delta \gamma)_{min} < 0 < P(\Delta \gamma)_{max} \quad (2)$$

Wherein the reference symbol z represents a zoom ratio, the reference symbols $\nu_{max}$ and $\nu_{min}$ designate the maximum and minimum Abbe's numbers respectively out of the Abbe's numbers of the lens units, and the reference symbols $P(\Delta \gamma)_{max}$ and $P(\Delta \gamma)_{min}$ denote the maximum and minimum percentages out of the percentages of the chromatic aberrations of angular magnification relative to angular magnification.

The fundamental composition of the zoom view finder according to the present invention is exemplified in FIG. 1. Speaking concretely, the zoom view finder according to the present invention comprises a first lens unit having a negative refractive power, a second lens unit having a positive refractive power and a third lens unit having a negative refractive power. The zoom view finder according to the present invention is so adapted as to correct the chromatic aberrations favorably in the lens system as a whole with a small number of lenses by adequately selecting Abbe's numbers for the respective lens units according to distribution of refractive powers for the lens units. "Abbe's numbers (represented by $\nu_G$) of the lens units" mean here the values expressed by the following formula when powers of a lens unit for the d-line, F-line and C-line are designated by $\phi_d$, $\phi_F$ and $\phi_C$ respectively;

$$\nu_G = \phi_d / (\phi_F - \phi_C)$$

The zoom view finder according to the present invention corrects the chromatic aberrations in the whole lens system as described below. That is to say, the zoom view finder according to the present invention is not designed so as to minimize the chromatic aberrations at all the zooming positions (in a range from high to low magnification levels). On the premises that the chromatic aberration of diopter $\Delta D$ is calculated as $\Delta D = D_F - D_C$ when diopters of the view finder for the d-line, F-line and C-line are represented by $D_d$, $D_F$ and $D_C$ respectively, and that the chromatic aberration of angular magnification $\Delta \gamma$ is calculated as $\Delta \gamma = \gamma_F - \gamma_C$ when the angular magnifications for the d-line, F-line and C-line are designated by $\gamma_d$, $\gamma_F$ and $\gamma_C$ respectively, the zoom view finder according to the present invention is so designed as to correct the chromatic aberration of diopter at a certain zooming position, the chromatic aberration of angular magnification at another zooming position and minimize the chromatic aberrations to such a degree as not to aggravate images at the other zooming positions.

Since the view finder has a small NA on the emerging side, it is possible to minimize the chromatic aberration of spherical aberration, etc. by correcting the aberrations at the standard wavelength, and correcting the chromatic aberration of diopter and chromatic aberration of angular magnification as described above.

The chromatic aberration of diopter $\Delta D$ and chromatic aberration of angular magnification $\Delta \gamma$ can be expressed as follows by taking differences:

$$\Delta D = \left\{ \frac{D^2 \cdot \phi_1}{\phi_t^2} \cdot \frac{1}{\nu_{G1}} + \frac{D^2 (1 - e_1\phi_1)^2 \phi_2}{\phi_t^2} \cdot \frac{1}{\nu_{G2}} + (10^3 + e_p D)^2 \cdot \phi_3 \cdot \frac{1}{\nu_{G3}} \right\} \times 10^{-3} \quad \text{(i)}$$

$$P(\Delta\gamma) = ([e_p \{(1 - e_2\phi_3)(1 - e_1\phi_2) - e_1\phi_3\} + e_1 + e_2 - e_1e_2\phi_2] \times \phi_1 \times \frac{1}{\nu_{G1}} + (1 - e_1\phi_1) \{e_p(1 - e_2\phi_3) + e_2\} \times \phi_2 \times \frac{1}{\nu_{G2}} + e_p \{(1 - e_1\phi_1)(1 - e_2\phi_2) - e_2\phi_1\} \times \phi_3 \times \frac{1}{\nu_{G3}}) \times \frac{D}{\phi_t} \times 10^{-1} \quad \text{(ii)}$$

wherein the diopter has a value as measured from the eye point, the reference symbol $\phi_t$ represents the power of the whole lens system at the standard wavelength and $P(\Delta\gamma)$ is calculated as $(\Delta\gamma/\gamma) \times 100(\%)$. Further, the reference symbols $\phi_1$, $\phi_2$ and $\phi_3$ represent powers of the lens units respectively, the reference symbol $e_1$ designates the distance between the principal points of the first and second lens units, the reference symbol $e_2$ denotes the distance between the second and third lens units, and the reference symbol $e_p$ represents the distance as measured from the rear principal point of the third lens unit to the eye point.

Let us now assume that the wide position, standard position and tele positions are referred to as position 1, position 2 and position 3 respectively, and that the angular magnification at the position 2 is so set as to be the geometrical mean of the angular magnification at the position 1 and the angular magnification at the position 3.

When the chromatic aberrations at j position are represented by $\Delta D_j$ and $P(\Delta\gamma_j)$ respectively, and No. of a lens unit is designated as i, the chromatic aberrations in the whole lens system are expressed by the following formulae:

$$\Delta D_j = \sum_{i=1}^{3} a_{ij}(1/\nu_{Gi}) \quad \text{(iii)}$$

$$P(\Delta\gamma_j) = \sum_{i=1}^{3} b_{ij}(1/\nu_{Gi}) \quad \text{(iv)}$$

When matrices $A = \{a_{ij}\}$ and $\{B = b_{ij}\}$ (i=1, 2, 3 and j=1, 2, 3) are considered, the chromatic aberrations at the above-mentioned three positions are corrected in the following conditions:

$$\begin{pmatrix} \Delta D_1 \\ \Delta D_2 \\ \Delta D_3 \end{pmatrix} = A \begin{pmatrix} 1/\nu_{G1} \\ 1/\nu_{G2} \\ 1/\nu_{G3} \end{pmatrix} = (0) \quad \text{(v)}$$

$$\begin{pmatrix} P(\Delta\gamma_1) \\ P(\Delta\gamma_2) \\ P(\Delta\gamma_3) \end{pmatrix} = B \begin{pmatrix} 1/\nu_{G1} \\ 1/\nu_{G2} \\ 1/\nu_{G3} \end{pmatrix} = (0) \quad \text{(vi)}$$

In order to satisfy the conditions (v) and (vi) mentioned above, all of $$\frac{1}{\nu_{G1}}, \frac{1}{\nu_{G2}} \text{ and } \frac{1}{\nu_{G3}}$$

must be zero, or A and B must satisfy special conditions.

$$\frac{1}{\nu_{G1}} = \frac{1}{\nu_{G2}} = \frac{1}{\nu_{G3}} = 0$$

corresponds to cancellation of chromatic aberrations in each lens unit. Accordingly, manufacturing cost for the lens system is increased to satisfy the special conditions as described above. Further, it is impossible to set A and B so as to satisfy the special conditions since the lens system must perform zooming. Concrete calculations of the factors of A and B in an embodiment clarifies a relation expressed by the following formula (vii):

$$(a_{1j} + a_{3j})/a_{2j} \approx (b_{1j} + b_{3j})/b_{2j} \approx 2 \quad \text{(vii)}$$

For $\nu_1$, $\nu_2$ and $\nu_3$ satisfying the condition expressed by the following formula (viii):

$$\begin{pmatrix} a_{21} & a_{22} & a_{23} \\ b_{21} & b_{22} & b_{23} \end{pmatrix} \begin{pmatrix} 1/\nu_{G1} \\ 1/\nu_{G2} \\ 1/\nu_{G3} \end{pmatrix} = (0) \quad \text{(viii)}$$

the relation expressed by the formula (vii) can be expressed by the following formula (ix):

$$A \begin{pmatrix} 1/\nu_{G1} \\ 1/\nu_{G2} \\ 1/\nu_{G3} \end{pmatrix} \approx \begin{pmatrix} \Delta D_1 \\ 0 \\ -\Delta D_1 \end{pmatrix}, \quad B \begin{pmatrix} 1/\nu_{G1} \\ 1/\nu_{G2} \\ 1/\nu_{G3} \end{pmatrix} \approx \begin{pmatrix} P(\Delta\gamma_1) \\ 0 \\ -P(\Delta\gamma_1) \end{pmatrix} \quad \text{(ix)}$$

This means that the chromatic aberrations are zeroed at the standard position, and that the chromatic aberrations are equal in absolute values thereof and have signs reverse to each other at the wide and telepositions. When $\nu_{G1}$, $\nu_{G2}$ and $\nu_{G3}$ satisfy the relation expressed by the formula (viii), the relation among Abbe's numbers of the lens units is expressed as ratios among the Abbe's numbers. Therefore, when an Abbe's number is selected for a lens unit, Abbe's numbers for the rest two lens units are determined consequently.

Furthermore, the chromatic aberrations are minimized as a larger Abbe's number is selected for each lens unit as is understood from the formulae (iii) and (iv). By the way, Abbe's numbers may exceed the range of the Abbe's numbers of the currently available glass materials when the formula (viii) is solved with no restriction.

In such a case, ratios among the Abbe's numbers obtained as the solutions may be limited within the range of the Abbe's numbers of the available glass materials by determining Abbe's numbers, by utilizing the little variations of the chromatic aberrations of diopter, in such a manner that the chromatic aberration of diopter is zeroed at the position 1 and the chromatic aberration of angular magnification is zeroed at the position 2. Such determination corresponds to solution of the equation expressed by the following formula (x):

$$\begin{pmatrix} a_{11} & a_{12} & a_{13} \\ b_{21} & b_{22} & b_{23} \end{pmatrix} \begin{pmatrix} 1/\nu_{G1} \\ 1/\nu_{G2} \\ 1/\nu_{G3} \end{pmatrix} = (0) \quad (x)$$

In addition, it may be necessary, depending on power distribution, to set ratios among Abbe's numbers with the chromatic aberrations preliminarily zeroed at the position 1.

The zoom view finder according to the present invention has succeeded in sufficiently correcting the chromatic aberrations by using the technique described above. In other words, the present invention has succeeded in correcting the chromatic aberrations by reserving differences among Abbe's numbers of the lens units. Accordingly, the maximum Abbe's numbers of those of the lens units must have a difference larger than a certain value from the minimum Abbe's number. When all the Abbe's numbers of the lens units are large, however, it is permissible to reserve a small difference between the Abbe's numbers. When the maximum and minimum Abbe's numbers out of those of the lens units are represented by $\nu_{max}$ and $\nu_{min}$ respectively, it is sufficient to select a constant value for $(\nu_{max} - \nu_{min}) \cdot \nu_{min}$.

When a zoom ratio is designated by z, however, it is necessary to select a larger value for $(\nu_{max} - \nu_{min}) \cdot \nu_{min}$ as the zoom ratio z is higher, and the value should be increased in proportion to $z^{\frac{1}{2}}$. When this zoom ratio is also taken into consideration, it is therefore necessary to satisfy the above-mentioned condition (1).

If the lower limit of the condition (1) is exceeded, the chromatic aberrations will be insufficiently corrected. If the upper limit of the condition is exceeded, in contrast, most of the lens units have large Abbe's numbers and must be made of highly priced glass materials or comprise cemented lenses, thereby increasing manufacturing cost of the zoom view finder.

The condition (2) is necessary to limit absolute value of the chromatic aberration of angular magnification within a practically usable range while allowing a large variation of the chromatic aberration of angular magnification. When $P(\Delta\gamma)_{max} - P(\Delta\gamma)_{min}$ is assumed to be constant, the maximum absolute value of $P(\Delta\gamma)$ is larger, in case of $0 < P(\Delta\gamma)_{min} < P(\Delta\gamma)_{max}$ or in case of $P(\Delta\gamma)_{min} < P(\Delta\gamma)_{max} < 0$, than that in case of $P(\Delta\gamma)_{min} < 0 < P(\Delta\gamma)_{max}$ defined in the condition (2). Further, in order to minimize $P(\Delta\gamma)_{max} - P(\Delta\gamma)_{min}$, it is necessary to use glass materials having low dispersing power or cemented lenses, which will undesirably increase manufacturing cost of the zoom view finder.

Furthermore, it is more effective to set such ratios of Abbe's numbers as to obtain $P(\Delta\gamma)_{max} \approx -P(\Delta\gamma)_{min}$.

A composition of the zoom view finder according to the present invention will be concretely exemplified below. That is to say, the zoom view finder comprises in the order from the object side a negative lens unit, a positive lens unit, a positive lens unit and a negative lens unit. During zooming operation, the negative lens unit arranged on the object side and the negative lens unit arranged on the image side are kept fixed, whereas the two positive lens units are displaced toward the object side as a whole while varying the airspace reserved therebetween to enhance angular magnification while keeping a constant diopter.

Further, the lens unit arranged on the image side comprises a negative lens and a half mirror is arranged on the eye point side of the negative lens, whereby an image of an optical frame or the like formed on a plane parallel plate is focused in the system of an Albada finder.

When the ratio between the maximum value and minimum value of the total focal length of the aforementioned movable lens units is represented by Y and the zoom ratio of the zoom view finder is designated by Z, it is possible to regard that the two positive lens units are displaced almost together during the zooming operation if a relationship of $Y < Z^{0.1}$ is satisfied. Therefore, it is possible to regard that these two lens units are a single lens unit and that the lens system comprises three lens units.

In case of such a simple lens composition as is described above, power distribution in the lens system is rather restricted when angular magnification, total length and diameter of the lens system are taken into consideration. When aberrations are corrected at the standard wavelength (for the d-line), values of the parameters r, d and n are limited, thereby determining power distribution almost definitively. In other words, aforementioned matrices A and B are determined almost definitively.

As is understood from the foregoing descriptions, the zoom view finder according to the present invention is designed not so as to correct the chromatic aberrations favorably in each of the lens units by selecting different Abbe's numbers for the lens units according to power distribution among the lens units, but so as to correct the chromatic aberrations in the lens system as a whole. Accordingly, it is desirable that Abbe's numbers are largely different between the lens unit having the maximum Abbe's number and the lens unit having the minimum Abbe's number out of all the lens units, or that the ratio between the maximum Abbe's number and the minimum Abbe's number exceeds 1.4. Further, the chromatic aberrations can be corrected favorably with a small number of lenses by selecting a minimum Abbe's number smaller than 40.

Furthermore, the minimum Abbe's number $\nu_{min}$ is smaller than 60 in the embodiment described later. This value is selected to eliminate the necessity to use a cemented lens or a glass material having a low dispersing power in the lens unit having the minimum Abbe's number. $\nu_{min}$ is set larger than 25 for the same reason.

BRIEF DESCRIPTION OF THE DRAWINGS

FIG. 1 shows a sectional view illustrating the fundamental composition of the zoom view finder according to the present invention;

FIG. 1 through FIG. 5 show sectional views illustrating compositions of Embodiments 1 through 4 of the zoom view finder according to the present invention;

FIG. 6 through FIG. 8 show curves illustrating aberration characteristics of the Embodiment 1;

FIG. 9 through FIG. 11 show curves illustrating aberration characteristics of the Embodiment 2;

DETAILED DESCRIPTION OF THE PREFERRED EMBODIMENTS

Figure 3:
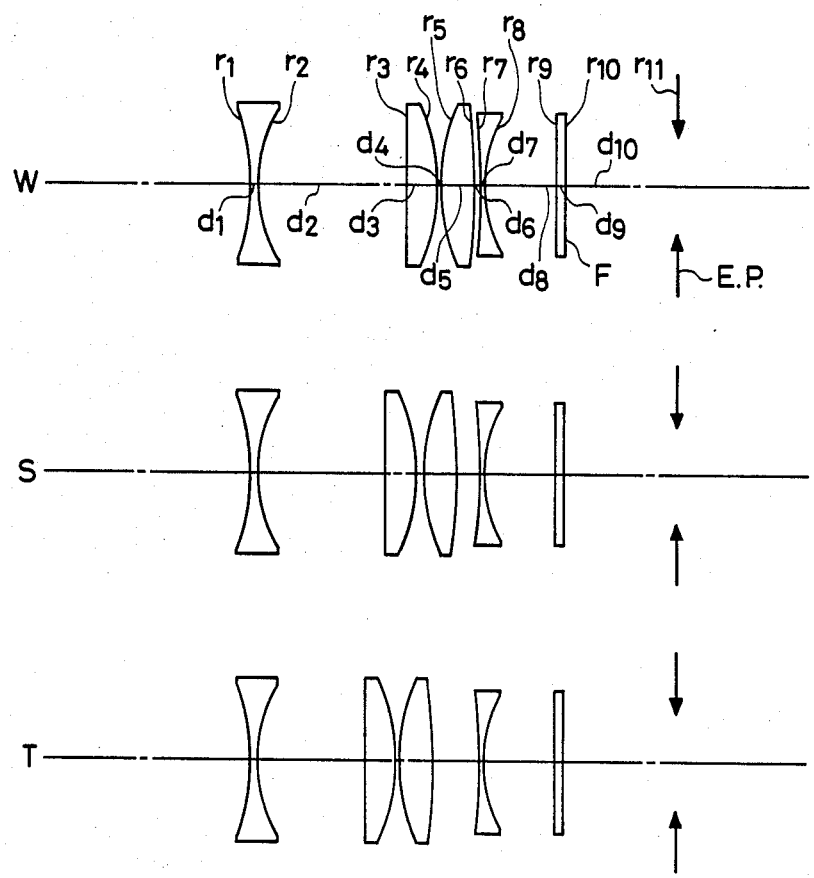

Now, the preferred embodiments of the present invention will be described detailedly with reference to numerical data and the accompanying drawings:

Embodiment 1

| Embodiment 1 | | |
|---|---|---|
| $r_1 = -37.787$ | | |
| $d_1 = 1$ | $n_1 = 1.7725$ | $\nu_1 = 49.66$ |
| $r_2 = 20.512$ | | |
| $d_2$ (variable) | | |
| $r_3 = \infty$ | | |
| $d_3 = 3.7$ | $n_2 = 1.50137$ | $\nu_2 = 56.4$ |
| $r_4 = -24.001$ | | |
| $d_4$ (variable) | | |
| $r_5 = 27.047$ | | |
| $d_5 = 3.97$ | $n_3 = 1.72916$ | $\nu_3 = 54.68$ |
| $r_6 = -119.184$ | | |
| $d_6$ (variable) | | |
| $r_7 = -146.355$ | | |
| $d_7 = 1.0$ | $n_4 = 1.59270$ | $\nu_4 = 35.29$ |
| $r_8 = 20.997$ | | |
| $d_8 = 10.44$ | | |
| $r_9 = \infty$ | | |
| $d_9 = 0.8$ | $n_5 = 1.50137$ | $\nu_5 = 56.4$ |
| $r_{10} = \infty$ | | |
| $d_{10} = 15$ | | |
| $r_{11}$ (eye point) | | |
| $1/\phi_1 = -17.0827$, | $1/\phi_{21} = 18.882$ | |
| $1/\phi_{22} = 19.035$, | $1/\phi_{23} = 18.895$ | |
| $1/\phi_3 = -30.913$ | | |
| $\nu_{G1} = 49.66$, | $\nu_{G21} = 56.09$, | $\nu_{G22} = 56.56$ |
| $\nu_{G23} = 56.13$, | $\nu_{G3} = 35.29$ | |

| | Position 1 | Position 2 | Position 3 |
|---|---|---|---|
| Angular magnification | 0.450 | 0.535 | 0.636 |
| $d_2$ | 21.10 | 17.44 | 14.51 (mm) |
| $d_4$ | 0.49 | 1.11 | 0.54 (mm) |
| $d_6$ | 0.50 | 3.54 | 7.04 (mm) |
| $\Delta D$ | −0.01 | 0.10 | 0.22 (diopter) |
| $P(\Delta\gamma)$ | −0.93 | −0.31 | 0.40 (%) |

$$\frac{(\nu_{max} - \nu_{min}) \cdot \nu_{min}}{\sqrt{Z}} = 631.4$$

Embodiment 2

| Embodiment 2 | | |
|---|---|---|
| $r_1 = -34.624$ | | |
| $d_1 = 1.189$ | $n_1 = 1.72916$ | $\nu_1 = 54.68$ |
| $r_2 = 19.737$ | | |
| $d_2$ (variable) | | |
| $r_3 = -881.098$ | | |
| $d_3 = 4.184$ | $n_2 = 1.50137$ | $\nu_2 = 56.4$ |
| $r_4 = -23.402$ | | |
| $d_4$ (variable) | | |
| $r_5 = 29.848$ | | |
| $d_5 = 4.3$ | $n_3 = 1.7725$ | $\nu_3 = 49.66$ |
| $r_6 = -106.202$ | | |
| $d_6$ (variable) | | |
| $r_7 = -232.233$ | | |
| $d_7 = 0.9$ | $n_4 = 1.59028$ | $\nu_4 = 30.9$ |
| $r_8 = 19.831$ | | |
| $d_8 = 9.86$ | | |
| $r_9 = \infty$ | | |
| $d_9 = 0.86$ | $n_5 = 1.50137$ | $\nu_5 = 56.4$ |
| $r_{10} = \infty$ | | |
| $d_{10} = 15$ | | |
| $r_{11}$ (eye point) | | |
| $1/\phi_1 = -17.083$, | $1/\phi_{21} = 18.890$ | |
| $1/\phi_{22} = 19.041$, | $1/\phi_{23} = 18.904$ | |
| $1/\phi_3 = -30.913$ | | |
| $\nu_{G1} = 54.68$, | $\nu_{G21} = 52.81$, | $\nu_{G22} = 53.23$ |
| $\nu_{G23} = 52.84$, | $\nu_{G3} = 30.9$ | |

| | Position 1 | Position 2 | Position 3 |
|---|---|---|---|
| Angular magnification | 0.450 | 0.535 | 0.636 |
| $d_2$ | 20.658 | 17.251 | 14.065 (mm) |
| $d_4$ | 0.487 | 1.104 | 0.544 (mm) |
| $d_6$ | 0.498 | 3.287 | 7.034 (mm) |
| $\Delta D$ | −0.04 | 0.07 | 0.23 (diopter) |
| $P(\Delta\gamma)$ | −0.89 | −0.24 | 0.63 (%) |

$$\frac{(\nu_{max} - \nu_{min}) \cdot \nu_{min}}{\sqrt{Z}} = 580.0$$

Embodiment 3

| Embodiment 3 | | |
|---|---|---|
| $r_1 = 942.099$ | | |
| $d_1 = 1$ | $n_1 = 1.58144$ | $\nu_1 = 40.75$ |
| $r_2 = 17.407$ | | |
| $d_2 = 1.938$ | | |
| $r_3 = -153.024$ | | |
| $d_3 = 1$ | $n_2 = 1.58144$ | $\nu_2 = 40.75$ |
| $r_4 = 24.249$ | | |
| $d_4$ (variable) | | |
| $r_5 = 54.974$ | | |
| $d_5 = 3.707$ | $n_3 = 1.72916$ | $\nu_3 = 54.68$ |
| $r_6 = -30.700$ | | |
| $d_6$ (variable) | | |
| $r_7 = 24.84$ | | |
| $d_7 = 2.752$ | $n_4 = 1.72916$ | $\nu_4 = 54.68$ |
| $r_8 = 131.787$ | | |
| $d_8$ (variable) | | |
| $r_9 = -52.270$ | | |
| $d_9 = 1$ | $n_5 = 1.59551$ | $\nu_5 = 39.21$ |
| $r_{10} = 20.389$ | | |
| $d_{10} = 10$ | | |
| $r_{11} = \infty$ | | |
| $d_{11} = 0.8$ | $n_6 = 1.50137$ | $\nu_6 = 56.40$ |
| $r_{12} = \infty$ | | |
| $d_{12} = 15$ | | |
| $r_{13}$ = eye point | | |
| $1/\phi_1 = -15.9078$, | $1/\phi_{21} = 16.8258$ | |
| $1/\phi_{22} = 17.3357$, | $1/\phi_{23} = 17.1298$ | |
| $1/\phi_3 = -24.5044$ | | |
| $\nu_{G1} = 39.41$, | $\nu_{G21} = 55.68$, | $\nu_{G22} = 57.49$ |
| $\nu_{G23} = 56.74$, | $\nu_{G3} = 39.21$ | |

|  | Position 1 | Position 2 | Position 3 |
| --- | --- | --- | --- |
| Angular magnification | 0.450 | 0.595 | 0.788 |
| $d_4$ | 21.349 | 15.778 | 11.251 (mm) |
| $d_6$ | 0.71 | 2.709 | 1.916 (mm) |
| $d_8$ | 0.899 | 4.472 | 9.792 (mm) |
| $\Delta D$ | 0.07 | 0.223 | 0.41 (diopter) |
| $P(\Delta\gamma)$ | −1.00 | −0.02 | 1.10 (%) |

$$\frac{(\nu_{max} - \nu_{min}) \cdot \nu_{min}}{\sqrt{Z}} = 538.4$$

Embodiment 4

| Embodiment 4 | | |
| --- | --- | --- |
| $r_1 = 494.598$ | | |
| $d_1 = 1$ | $n_1 = 1.804$ | $\nu_1 = 46.57$ |
| $r_2 = 38.387$ | | |
| $d_2 = 3.752$ | | |
| $r_3 = -53.422$ | | |
| $d_3 = 1$ | $n_2 = 1.55963$ | $\nu_2 = 61.17$ |
| $r_4 = 33.062$ | | |
| $d_4$ (variable) | | |
| $r_5 = 100.077$ | | |
| $d_5 = 2.397$ | $n_3 = 1.80518$ | $\nu_3 = 25.43$ |
| $r_6 = 30.804$ | | |
| $d_6 = 7.088$ | $n_4 = 1.72916$ | $\nu_4 = 54.68$ |
| $r_7 = -49.534$ | | |
| $d_7$ (variable) | | |
| $r_8 = 36.010$ | | |
| $d_8 = 4.301$ | $n_5 = 1.883$ | $\nu_5 = 40.78$ |
| $r_9 = -196.828$ | | |
| $d_9$ (variable) | | |
| $r_{10} = -95.438$ | | |
| $d_{10} = 1$ | $n_6 = 1.58913$ | $\nu_6 = 60.97$ |
| $r_{11} = 23.210$ | | |
| $d_{11} = 10.9$ | | |
| $r_{12} = \infty$ | | |
| $d_{12} = 0.8$ | $n_7 = 1.50137$ | $\nu_7 = 56.4$ |
| $r_{13} = \infty$ | | |
| $d_{13} = 14.1$ | | |
| $r_{14}$ (eye point) | | |
| $1/\phi_1 = -20.4108$, | $1/\phi_{21} = 21.2184$ | |
| $1/\phi_{22} = 21.96496$, | $1/\phi_{23} = 21.31753$ | |
| $1/\phi_3 = -31.59240$ | | |
| $\nu_{G1} = 51.74$, | $\nu_{G21} = 66.95$, | $\nu_{G22} = 68.52$ |
| $\nu_{G23} = 66.95$, | $\nu_{G3} = 60.87$ | |

|  | Position 1 | Position 2 | Position 3 |
| --- | --- | --- | --- |
| Angular magnification | 0.45 | 0.636 | 0.9 |
| $d_4$ | 23.108 | 14.095 | 8.313 (mm) |
| $d_7$ | 0.5 | 3.309 | 0.5 (mm) |
| $d_9$ | 0.8 | 7.344 | 16.015 (mm) |
| $\Delta D$ | 0.19 | 0.34 | 0.50 (diopter) |
| $P(\Delta\gamma)$ | −0.41 | 0.62 | 1.72 (%) |

$$\frac{(\nu_{max} - \nu_{min}) \cdot \nu_{min}}{\sqrt{Z}} = 613.9$$

wherein the reference symbols $r_1, r_2, \ldots$ represent radii of curvature on the surfaces of the respective lenses, the reference symbols $d_1, d_2, \ldots$ designate thicknesses of the respective lenses and airspaces reserved therebetween, the reference symbols $n_1, n_2, \ldots$ denote refractive indices of the respective lenses, the reference symbols $\nu_1, \nu_2, \ldots$ represent Abbe's numbers of the respective lenses, the reference symbols $\phi_1$ and $\phi_3$ designate powers of the first and third lens units respectively, the reference symbols $\nu_{G21}, \nu_{G22}$ and $\nu_{G23}$ denote powers of the second lens unit at the position 1, position 2 and position 3 respectively, the reference symbols $\nu_{G1}$ and $\nu_{G3}$ represent Abbe's numbers of the first and third lens units respectively, and the reference symbols $\nu_{G21}, \nu_{G22}$ and $\nu_{G23}$ designate Abbe's numbers of the second lens unit at the position 1, position 2 and position 3 respectively.

Out of the Embodiments described above, the Embodiment 1 has the composition shown in FIG. 2 wherein the zoom view finder comprises a first lens unit consisting of a negative lens, a second lens unit consisting of two positive lenses and a third lens unit consisting of a negative lens, and is so designed as to perform zooming by displacing the second lens unit while varying the airspace between the two positive lenses.

In order to zero the chromatic aberration of diopter and the chromatic aberration of angular magnification at the position 2 in the power distribution selected in this embodiment, ratios among the Abbe's numbers $\nu_{G1}$, $\nu_{G2}$ and $\nu_{G3}$ of the lens units must be: $\nu_{G1}:\nu_{G2}:\nu_{G3} = 3:2:1$. However, glass materials satisfying this requirements are not available. Therefore, ratios among the Abbe's numbers of the lens units are determined so as to zero the chromatic aberration of diopter at the position 1 and the chromatic aberration of angular magnification at the position 2. Then, the ratios are determined as: $\nu_{G1}:\nu_{G2}:\nu_{G3} = 1.7:1.7:1$. Since the second lens unit requires the highest refractive index, an Abbe's number of about 56 is determined by selecting a glass material having a high refractive index for the second lens unit. Accordingly, Abbe's numbers of $\nu_{G1} \sim 56$ and $\nu_{G3} \sim 33$ are determined for the first and third lens units respectively. The zoom view finder described as the Embodiment 1 of the present invention is obtained by using glass materials having Abbe's numbers close to the values mentioned above and through fine adjustment.

Figure 6:
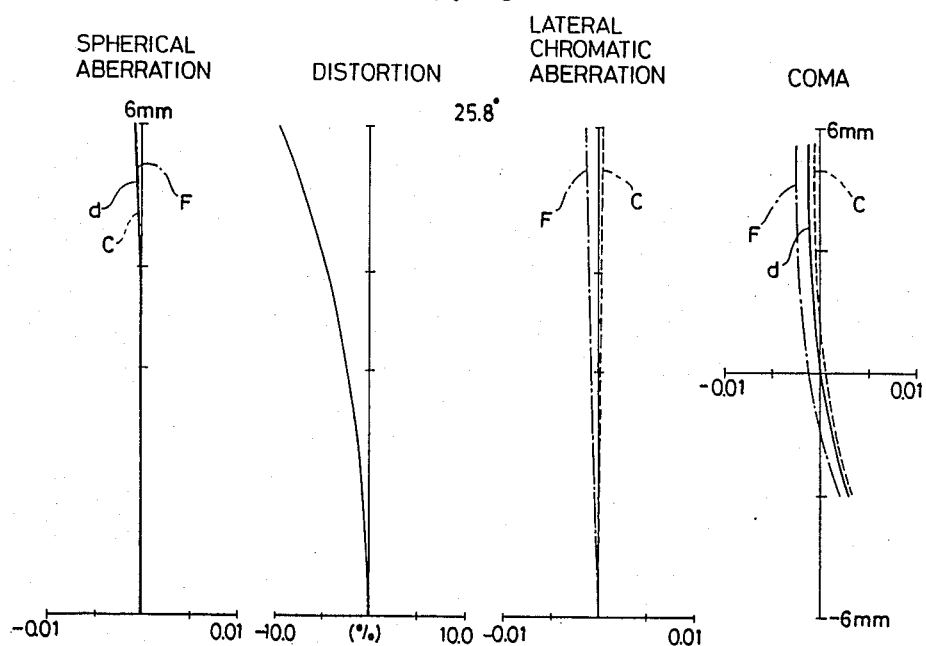
Figure 7:
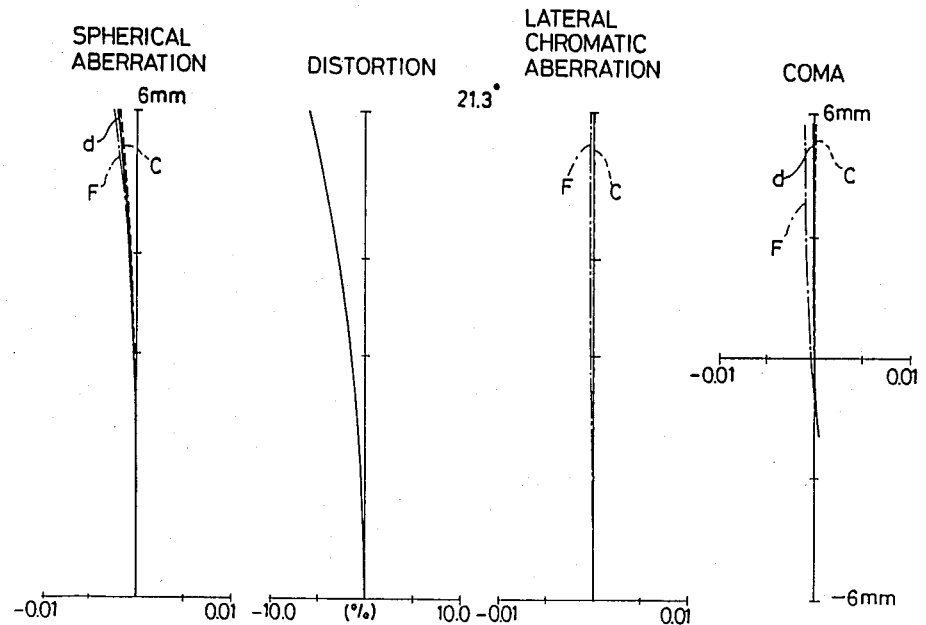

Aberration characteristics of the Embodiment 1 at the wide (W), standard (S) and tele (T) positions are illustrated in FIG. 6, FIG. 7 and FIG. 8 respectively.

The Embodiment 2 of the present invention is a lens system having the composition illustrated in FIG. 3 and designed with power distribution similar to that in the Embodiment 1. Therefore, ratios among Abbe's numbers of the lens units are set so as to zero the chromatic aberration of diopter at the position 1 and the chromatic aberration of angular magnification at the position 2. In the Embodiment 2, polystyrene is used as the material of the third lens unit to reduce manufacturing cost.

Figure 10:
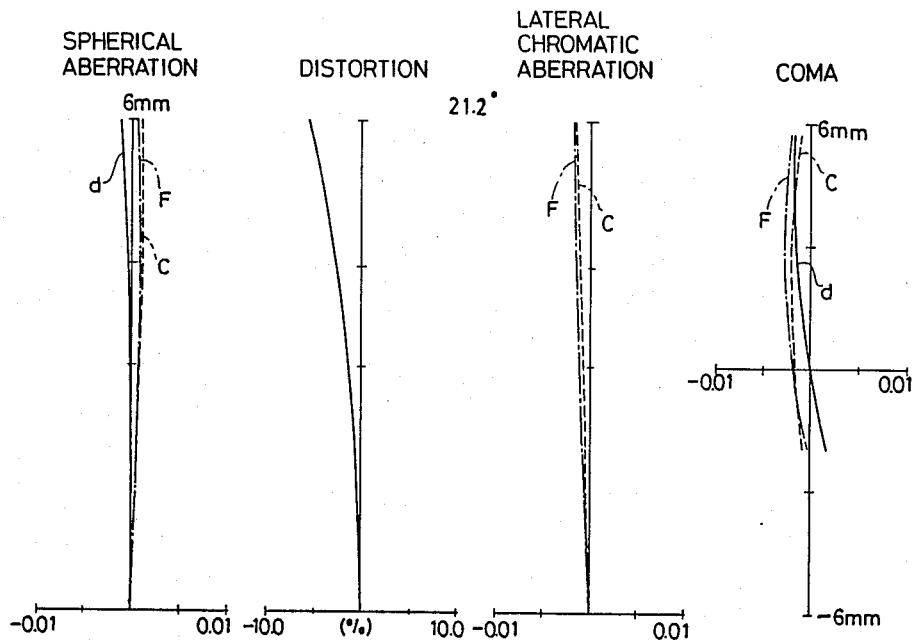
Figure 11:
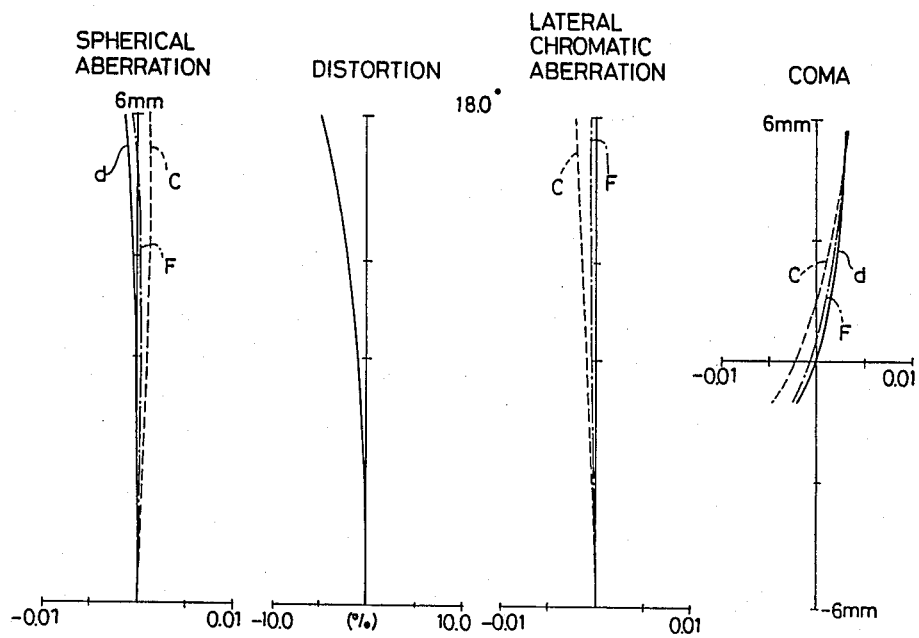

Aberration characteristics of the Embodiment 2 at the wide (W), standard (S) and tele (T) positions are illustrated in FIG. 9, FIG. 10 and FIG. 11 respectively.

Figure 4:
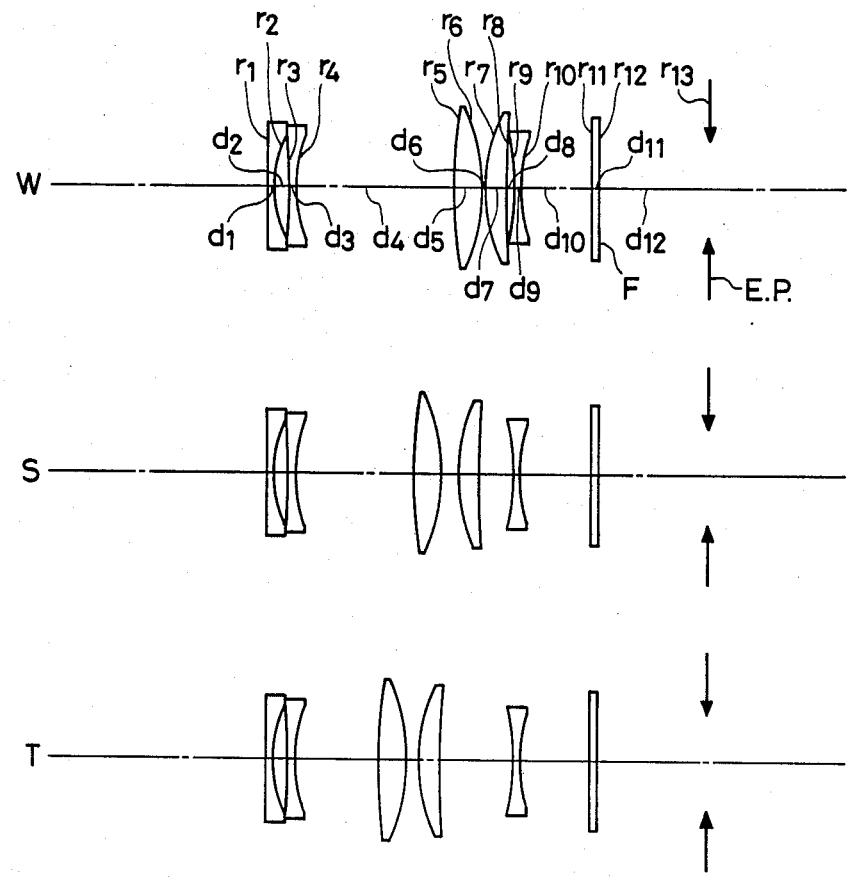

Embodiment 3 of the present invention has a lens composition shown in FIG. 4 wherein the first lens unit consists of two negative lenses. The Embodiment 3 is designed for a vari-focal ratio higher than that of the Embodiment 1 or 2.

In the power distribution selected for the Embodiment 3, $\nu_{G1}:\nu_{G2}:\nu_{G3} = 2:2:1$ is obtained when ratios among Abbe's numbers of the lens units are selected so as to zero the chromatic aberration of diopter and chromatic aberration of angular magnification at the position 2. Further, $\nu_{G1}:\nu_{G2}:\nu_{G3} = 1:1.4:1$ is obtained when ratios among Abbe's numbers of the lens units are selected so as to zero the chromatic aberration of diopter at the position 1 and the chromatic aberration of angular magnification at the position 2. Therefore, glass materials are selectable in either case from among those practically available. However, when degrees of the chromatic aberrations are compared taking the value of $\nu_{G2}$ as constant, the paraxial theory clarifies that $\nu_{G1}:\nu_{G2}:\nu_{G3}=2:2:1$ allows greater chromatic aberration than $\nu_{G1}:\nu_{G2}:\nu_{G3}=1:1.4:1$. Therefore, $\nu_{G1}:\nu_{G2}:\nu_{G3}=1:1.4:1$ is selected as a target. Setting these ratios as a target, the Embodiment 3 is achieved by selecting glass materials for the lens units in the same method as that described with reference to the Embodiment 1 and through fine adjustment.

Figure 12:
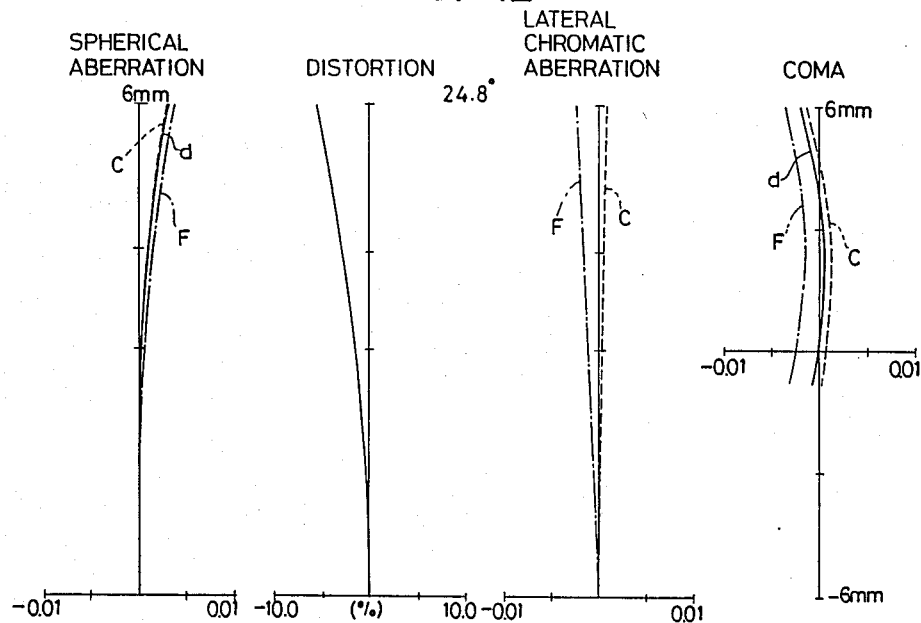
FIG. 12 through FIG. 14 show curves illustrating aberration characteristics of the Embodiment 3.
Figure 13:
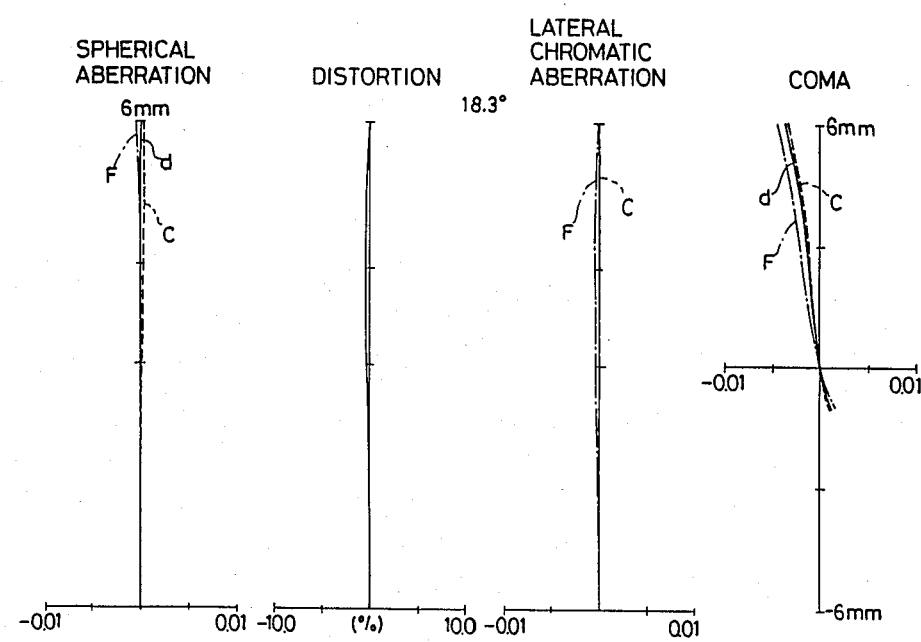
Figure 14:
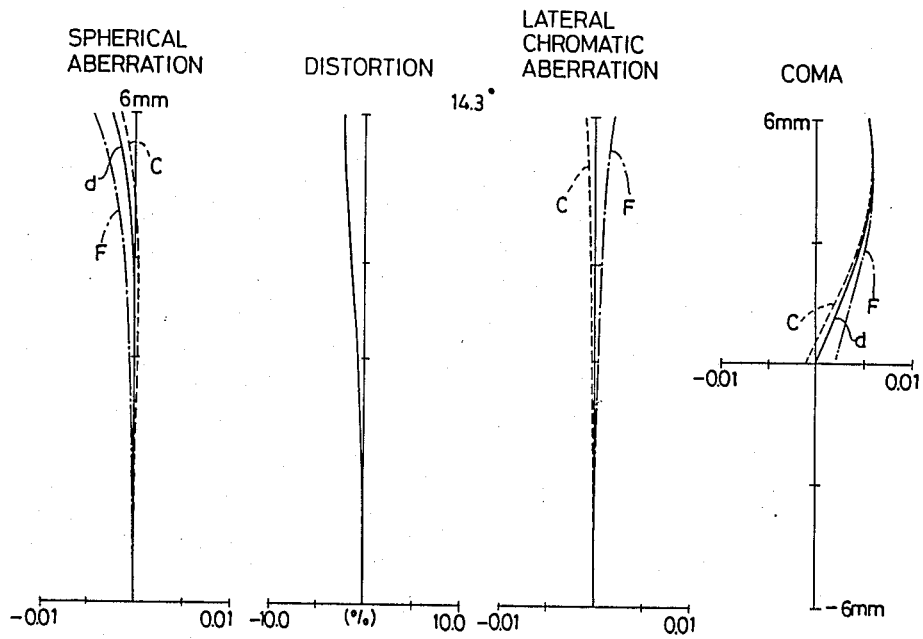

Aberration characteristics of the Embodiment 3 at the wide (W), standard (S) and tele (T) positions are illustrated in FIG. 12, FIG. 13 and FIG. 14 respectively.

Figure 5:
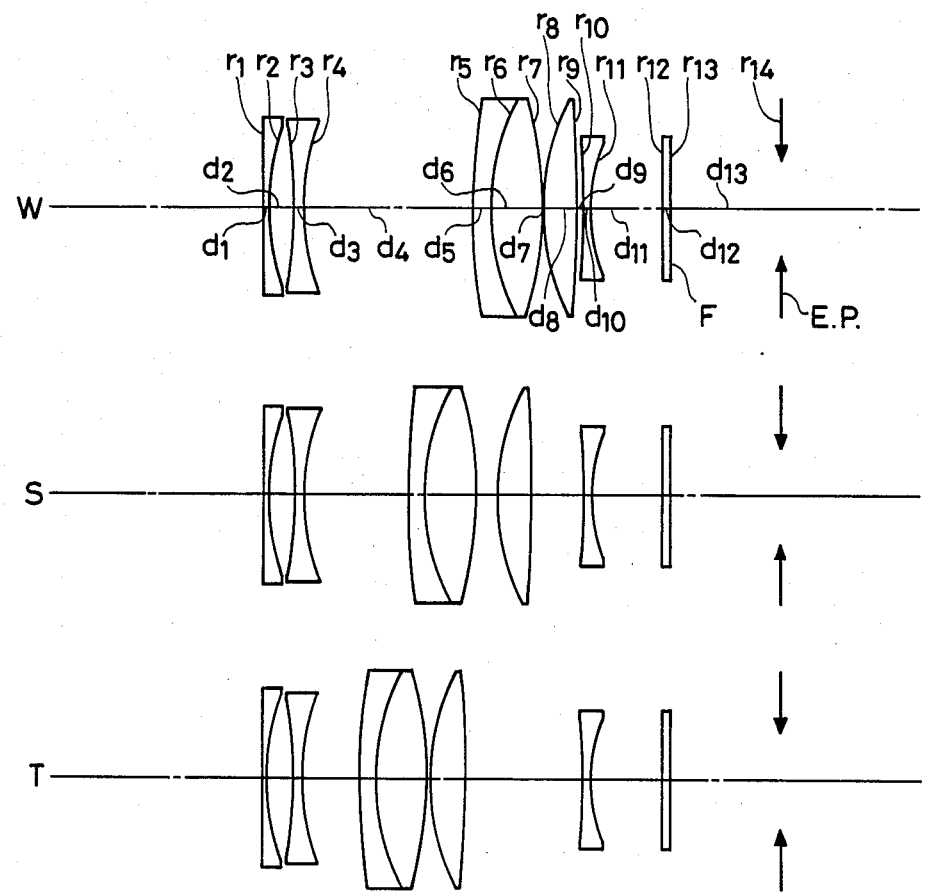

Embodiment 4 of the present invention has a lens composition shown in FIG. 5 wherein the first lens unit consists of two negative lenses, the second lens unit consists of a positive cemented doublet and a positive lens, and the third lens unit consists of a negative lens. The Embodiment 4 is designed for a vari-focal ratio higher than that of the Embodiment 3.

Figure 15:
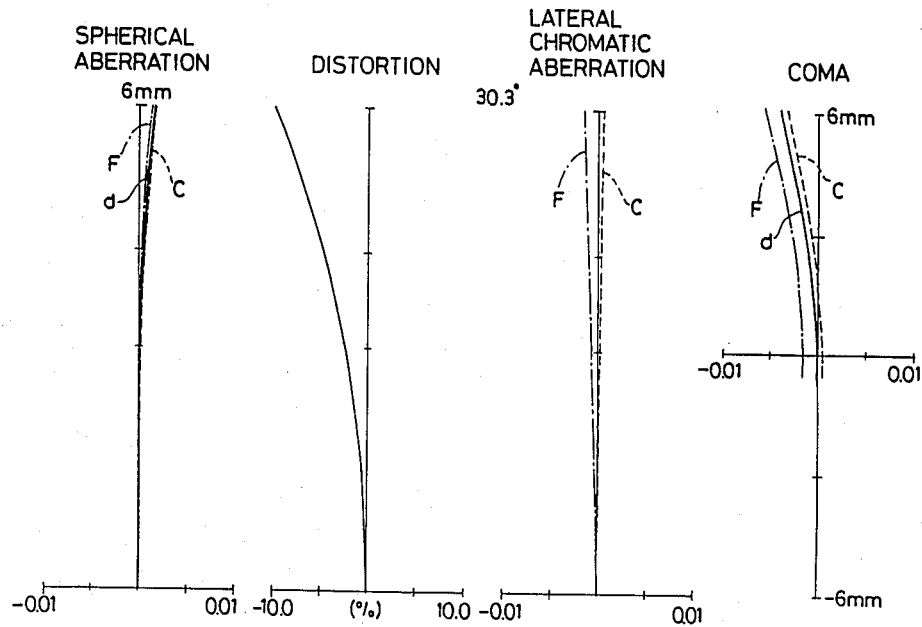
FIG. 15 through FIG. 17 show curves illustrating aberration characteristics of the Embodiment 4.
Figure 16:
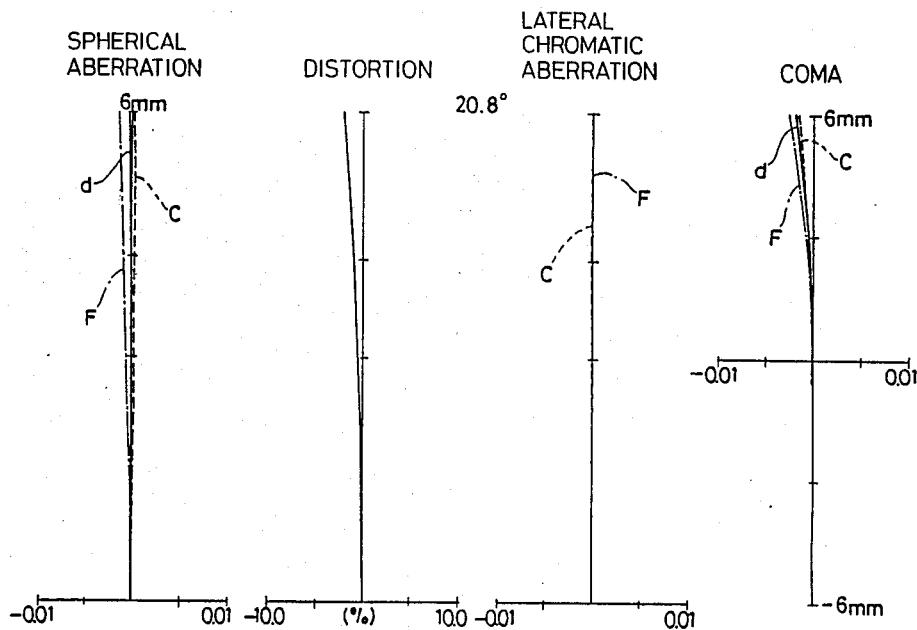
Figure 17:
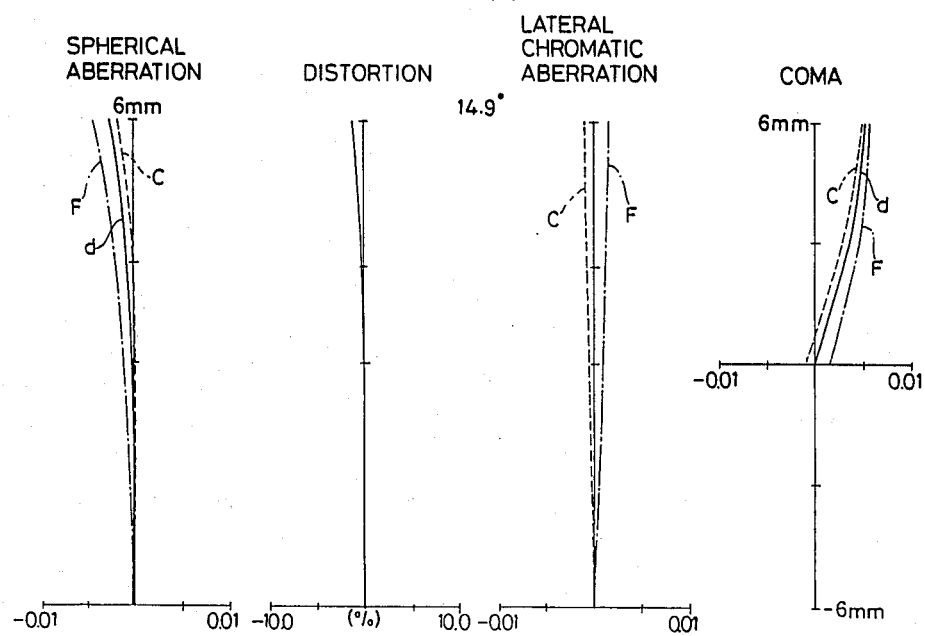

In case of the power distribution selected for the Embodiment 4, ratios among Abbe's numbers of the lens units are similar to those of the Embodiment 3. However, since absolute values of the chromatic aberrations are enlarged as the vari-focal ratio is higher, a cemented doublet is adopted to enlarge Abbe's numbers of the lens units while maintaining the ratios among Abbe's numbers set as the target. Though an Abbe's number $\nu_{G3}$ of about 50 is desirable for the third lens unit from the viewpoint of the paraxial theory, most of the glass materials having a refractive index $n=1.589$ and Abbe's number around 50 are low in acid resistance, and $\nu_{G3}=60.87$ is selected. The chromatic aberrations are corrected to such a degree as to pose no practical problem by selecting large Abbe's numbers for all the lens units. Aberration characteristics of the Embodiment 4 at the wide (W), standard (S) and tele (T) positions are illustrated in FIG. 15, FIG. 16 and FIG. 17 respectively.

Since the Embodiment 4 comprises the second lens unit which is thick, actual chromatic aberrations are largely different from those calculated taking the lens system as three lens units. In case of the Embodiment 4, actual chromatic aberrations are little different from those calculated taking the lens system as four lens units, i.e., taking the second lens unit as two lens units consisting of a cemented doublet and a single-element lens respectively.

In addition, ratios among the Abbe's numbers of the above-described lens units can be determined by the paraxial theory. In FIG. 2 through FIG. 5, the reference symbol F represents a plane parallel plate and the reference symbol E.P. designates the eye point.

In the drawings illustrating the aberration curves, the height of ray as measured at the eye point on the meridional plane is taken as the ordinate to trace spherical aberration, whereas the tangent of aberration expressed as an angle is taken as the abscissa to trace spherical aberration, chromatic aberration of magnification and coma.

By distributing Abbe's numbers of the lens units according to power distribution, the zoom view finder according to the present invention corrects the chromatic aberrations favorably in the lens system as a whole while limiting use of glass materials having ultra-low dispersing power and cemented lenses to the possible minimum

I claim:

1. A zoom finder comprising a first lens unit arranged on the extreme object side and having negative refractive power, a third lens unit arranged on the extreme image side and having negative refractive power, and a second lens unit arranged between said first and third lens unit and having positive lens units, for performing variation of focal length by shifting at least one of said lens units along the optical axis, and so designed as to satisfy the following conditions (1) and (2)

$$1000 > \frac{(\nu_{max} - \nu_{min}) \cdot \nu_{min}}{\sqrt{z}} > 500 \quad (1)$$

$$P(\Delta\gamma)_{min} < 0 < P(\Delta\gamma)_{max} \quad (2)$$

wherein the reference symbol z represents the zoom of said view finder, the reference symbol $\nu_{max}$ designates the maximum Abbe's number out of Abbe's numbers of the lens units, the reference symbol $\nu_{min}$ denotes the minimum Abbe's number out of Abbe's numbers of the lens units, the reference symbol $P(\Delta\gamma)_{max}$ represents the maximum value out of percentages of the chromatic aberrations of angular magnification relative to angular magnifications and the reference symbol $P(\Delta\gamma)_{min}$ designates the minimum value out of percentages of the chromatic aberrations of angular magnification relative to angular magnifications.

2. A zoom finder according to claim 1 wherein said second lens unit has positive refractive power and consists of two lens components separated from each other by an airspace therebetween, said first and third lens units having negative refractive power are kept fixed during the variation of focal length, and said second lens unit having positive refractive power is shifted as a whole toward the object side for variation of focal length while varying said airspace.

3. A zoom view finder according to claim I satisfying the following condition:

$$\frac{\nu_{max}}{\nu_{min}} > 1.4$$

4. A zoom view finder according to claim 3 satisfying the following condition:

$$\nu_{min} < 60$$

5. A zoom view finder according to claim 2 wherein said first lens unit consists of a single negative lens, said second lens unit consists of two positive lenses and said third lens unit consists of a single negative lens.

6. A zoom view finder according to claim 2 wherein said first lens unit consists of two negative lenses, said second lens unit consists of two positive lenses and said third lens unit consists of a negative lens.

7. A zoom view finder according to the claim I wherein said first lens unit consists of two negative lenses, said second lens unit consists of a cemented doublet and a positive lens, and said third lens unit consists of a negative lens.

* * * * *